INVENTOR
Joseph H. Martin
BY C. H. Mortenson
ATTORNEY

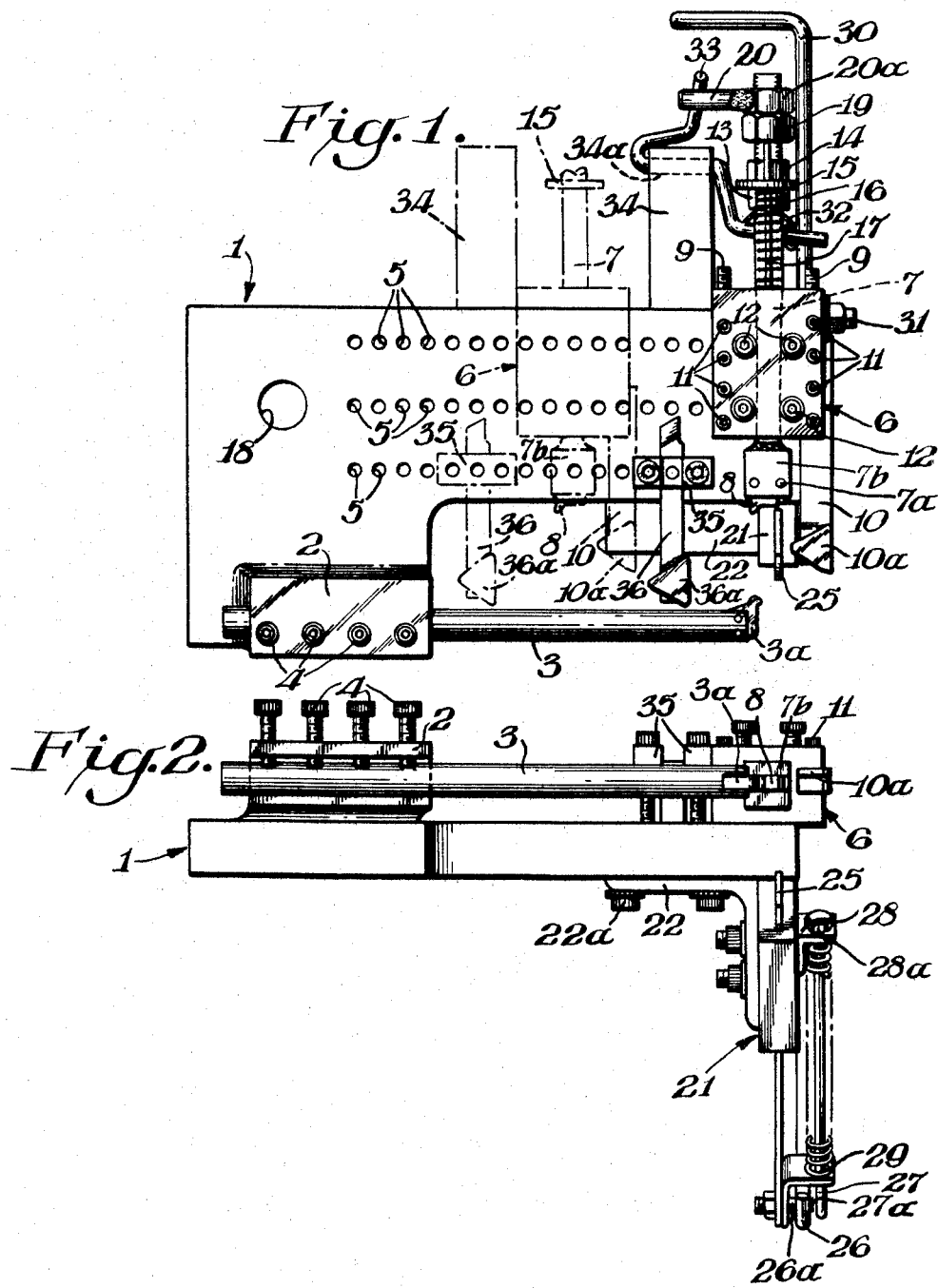

United States Patent Office 3,387,516
Patented June 11, 1968

3,387,516
LATHE TOOL ATTACHMENT
Joseph H. Martin, 16 S. Pennewell Drive, Edgemoor Gardens, Wilmington, Del. 19809
Filed Oct. 20, 1965, Ser. No. 498,618
4 Claims. (Cl. 82—25)

ABSTRACT OF THE DISCLOSURE

A lathe attachment is provided that holds secure more than one tool each of which can be moved toward or away from the work piece in the lathe, there being provided means for reciprocating the tools and connections between the tools effecting the reciprocating in unison so that a plurality of operations can be effected simultaneously on the workpiece.

*Disclosure*

This invention relates to a lathe attachment and more particularly to a tool attachment for lathes whereby a plurality of machining operations on a workpiece may be accomplished simultaneously.

Heretofore, when more than one operation was performed on a workpiece, normal procedure required the completion of one operation before starting on another, particularly if the operations were unrelated, as is usually the case. The previous procedures, therefore, were time-consuming and resulted in high costs in the finishing of the workpiece. Efficient utilization of the lathe equipment was not attained. The present invention eliminates the deficiencies in the earlier procedures and offers a greatly improved means for lathe machine work.

This invention has as a primary objective the provision of a tool attachment for lathes which allows one to do a plurality of different machine operations on a workpiece simultaneously. Another aim is to provide means for universal adjustment of tooling in order to machine any configuration of workpiece that falls within the size range of the base. Another purpose is the provision of means whereby two slidable members may be employed simultaneously, one of which affords the ready replacement of form-tool bits. Another object is the provision of a lathe attachment device which is sturdy and compact and which affords precision performance resulting in exceptionally high standards of accuracy. A further goal is providing a lathe attachment device which permits easy and rapid setting up, tooling and adjustment. Other objectives appear below.

The objectives of this invention are accomplished by means of a lathe attachment comprising a movable carriage fitted with a plurality of cutting tools mounted on said carriage so as to perform different operations on the workpiece simultaneously. For purposes of description the device of this invention is described with reference to five different tools and to an article shaped by the use of these tools.

Referring now to the drawings:

FIGURE 1 is a plan view of the lathe attachment with five tools and with some parts of the actuating linkage omitted for clarity;

FIGURE 2 is a side elevation veiw of the lathe attachment;

Figure 3:
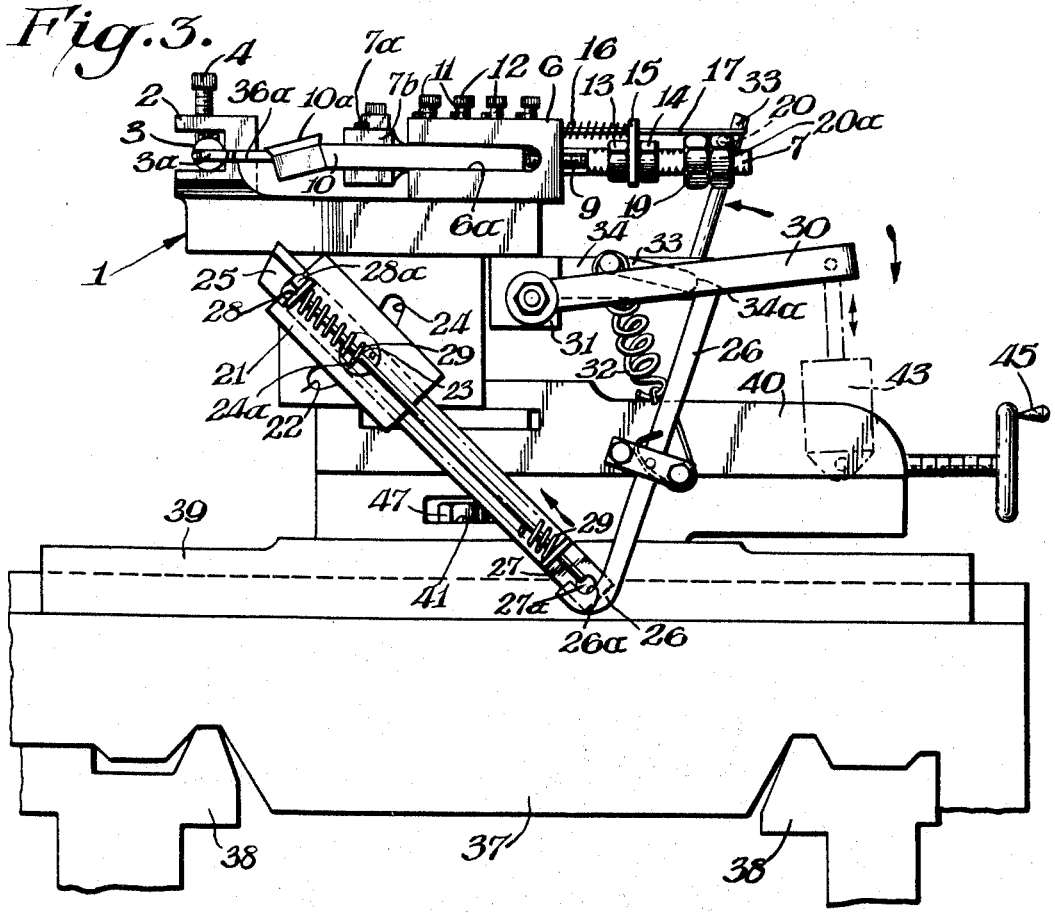
FIGURE 3 is a front elevation view of the lathe attachment showing the part-off tool.

There are shown in FIGURE 1, in solid lines, five cutting tools (3a, 8, 10a, 25 and 36a) mounted on or supported by the basic mounting of this invention. These tools are a boring tool 3a, an outside-diameter turning tool 10a, a facing tool 8, a rear facing tool 36a and a parting-off tool 25. These may be placed at various places on the basic mounting plate and two of these tools, the diameter turning tool and the part-off tool, are slidable members preferably adapted, as will be seen, to move simultaneously. Other sub-tools and parts thereof my be also held by the mounting plate, so that many fixed positioned tools can operate simultaneously, and machining any part of any configuration can readily be accomplished by the universal adjustment base of this invention.

Figure 4:
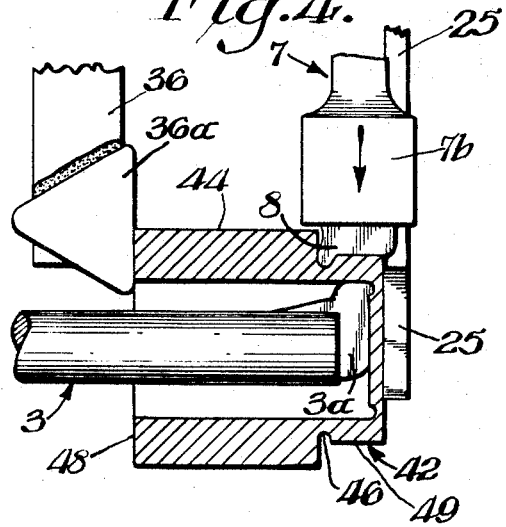
FIGURE 4 is a fragment of a plan view of certain of the several machine tools in operational position with respect to a workpiece which is shown in cross-section.

Referring to FIGURE 1, basic mounting plate 1 contains and supports the several essential machining elements referred to above and the means for their support and adjustment. Support 2 adjustably holds boring bar 3 fitted with replaceable tool bit 3a in rigid operational position by means of bolts 4. Bar 3 may be moved toward the right or left, and it is best anchored in place by use of several locking members 4. Bar 3 is held stationary during the work on the article being machined, it being understood that the article itself is being turned. The article is held and turned as it is brought into contact with the bit 3a which makes an internal bore as seen in FIGURE 4.

Various mounting positions 5 on unit 1 consist of tapped holes and these permit the shifting of the several functional operating tool sub-assemblies, such as element 6, to any desired position, bolts like bolts 4 or similar anchor devices being used to lock the element into place. FIGURE 1 shows element 6 in dotted lines and in solid lines to illustrate that the element may be moved about or that a plurality of them or other holders may be used simultaneously.

Element 6 is a support for the one of the tools mentioned above that move simultaneously, and this support 6 can be placed wherever desired on universal base 1. It is mounted to base 1 by bolts 12, and it houses a plurality of tools such as slidable element 7 which is slotted horizontally and threaded vertically at its large square end to hold securely a replaceable undercut tool bit 8. The bolts 7a (FIGURES 1 and 3) hold the bit 8 in position in the slot. The slot 6a is best seen in FIGURE 3. The narrow rear end of slidable element 7 is threaded to engage two lock nuts 13 and 14 which are used to provide adjustable stop positions for element 7 by means of a guide plate 15 between lock nuts 13 and 14. This plate 15 engages the slide return spring 16 which is retained by rod 17. Elements 16 and 17 are above element 7. The rod 17 runs through a hole (not shown) in plate 15 and the return spring is mounted on rod 17, as can best be seen in FIGURE 3, so that one end of the spring bears against support 6 and the other end bears against plate 15. One end of rod 17 is supported by element 6 and the far end is unsupported, except, of course, for the holding of the rod by plate 15.

In operation the head 7b of element 7 and the diameter undercut tool bit 8 move forward into position by the movement of element 7. The operator turns crank or wheel 45 shown in FIGURE 3 to effect the initial setting of the device of this invention and the operator then actuates element 7 through lever 33 as explained below.

Before describing the linkages that move the part-off tool 25 and that move tool 8, reference is first made to tool 10 also housed by base 6. This base is slotted (6a) on both sides and positioned at the end of the sub-assembly 6 farthest from the article being worked on are two adjusting screws 9 (FIGURE 1). The screw 9 on the right is used to adjust the position of the diameter turning tool 10 (FIGURES 1 and 3), it being appreciated that one of the screws is inactive in the drawings but that it could be used for adjusting a tool positioned respectively in housing 6. Tool 10 is stationary and is fitted with replaceable tool bit 10a, and tool 10 is held by set screws 11. This tool determines the outside diameter of the article 42 shown in FIGURE 4. That is, upon the turning of the article in contact with bit 10a the outside surface 44 is cut.

Referring now to the second tool that is movable during the machining, FIGURES 1 and 3 show lock nut 19 located near the end of the threaded portion of element 7. Lock nut 19 functions to maintain the position of plunger pin 20. As shown in FIGURE 1 plunger pin 20 is an integral part of nut 20a that is threaded onto element 7 at its threaded end. Parting-off tool holder 21 (FIGURE 3) is supported by adjustable mounting bracket 22. As shown in FIGURE 2, bracket 22 may be variously positioned on base 1, for mounting pins 22a fitting into tapped holes 5 allows its adjustment horizontally and longitudinally along the length of the base 1. As seen in FIGURE 3, the tool holder 21 is arcuately adjustable on bracket 22 by means of a pivot point 23 and a bolt 24a through radial slot 24. Tool holder 21 also houses slidable member 25 which is used as a parting-off tool. That is, when the turning workpiece contacts the cutting edge of tool 25, the piece is severed from the turning entirely and the edge 49 (FIGURE 4) is formed. At the non-working end of tool 25 and bolted to it is bracket or hook 26 and bearing point 26a. Bracket 26 slides over rod 27. At the other end of rod 27 and threaded on it is plate 28 held there by nut 28a. These provide retaining means for the parting tool return spring 29. As rod 27 advances upwardly so does parting-off tool 25 to cut article 42 from the stock.

Bearing point 26a is acted upon through arm 26 by linkage actuator 30 to provide movement of the mechanism. The linkage actuator 30, which may be manually or power operated, comprises a forked arm pivoted on bracket 31 and provides the means to move parting-off tool 25 by sliding the lower fork 26 across bearing point 26a. Simultaneously linkage actuator 30 transmits movement through the differential take-up spring 32 to the crank-lever 33 which is hinged on supports 34 and 34a which are bolted to the underside or mounting plate 1. Arm 33 passes through a hole in support 34 and is free to rotate therein, as it moves up or down. This hole 34a and the mounting is shown in FIGURE 1. This mechanism transmits movement to slidable element 7 which contains tool 8. At the same time tool 8 is making the under-cut 46 (FIGURE 4), the parting-off tool is advancing toward the article 42 as described above and being synchronized, face 25 cuts off the article from the stock forming face 49 just as face 46 is finished and the other operations are completed. Upon release of the downward pressure on element 30, spring 16 returns element 7, spring 29 returns rod 27 and spring 32 returns rod 26, and the finished article is taken off tool 3.

Mounting clamp 35 (FIGURE 1) provides a means for attaching replaceable turning tool 36 or other suitable tooling. This is used to face the rear of article 42.

FIGURE 3 also illustrates the new device resting on a lathe carriage 37. Also shown there are the bedways 38 and the cross-slide 39. Elements 40 and 45 are lathe parts and T-bolt 47 in hole 41 merely holds such lathe parts on the lathe. The universal base 1 of this invention is bolted to the lathe element 40 by means of a standard T-slot bolt, not shown for convenience, but, for example, through hole 18 shown in FIGURE 1.

In FIGURE 4 the workpiece 42 consisting of graphite is shown in cross-section being worked upon by the several tools simultaneously. Element 7 with tool 8 is in position to cut the groove 46. Facing tool 36 and tool 36a are acting to form face 48. Bore holder 3 and tool 3a are forming the inside bore, as shown. Finally, parting is being effected by cut-off tool 25 forming face 49. The outside diameter tool 10 with tool 10a is not shown in this view.

The device may be operated manually or power operated by conventional means, for example by a pneumatic power cylinder 43 shown in FIGURE 3. This effects the downward movement of lever 30 putting into action all of the movements described above relative to the two tools that are made to operate simultaneously.

The invention has been described and illustrated in the performance of five separate machining operations on a workpiece simultaneously, namely, diameter turning, facing, parting off, undercutting and boring. However, other machine operations may also be performed on the same simultaneous basis by the substitution of other tools and bits for those described with suitable placement and adjustment.

Preparatory to operating the device, it is mounted on the compound slide of any standard lathe parallel to the bedways of the lathe. The tool in operation is first adjusted to position the level of the boring bar's replaceable bit on the horizontal centerline of the lathe spindle. Then the tool is adjusted horizontally until the boring bar bit cuts the proper size hole. The remaining turning tools are then adjusted to cut proper size and longitudinal dimension cutting tools are preset. Once the device is properly adjusted, only the lathe carriage is moved longitudinally and the tool linkage is activated in order to machine the part desired.

The device of the present invention offers a number of important improvements, the chief of which resides in its capacity to permit a plurality of different machining operations on a workpiece simultaneously. The attachment is sturdy and compact and versatile in its operation. It affords precision performance at very high speeds and is readily operated.

While the invention has been described herein in connection with certain embodiments and certain structural and procedural details, it is clear that changes, modifications or equivalents can be used by those skilled in the art; accordingly, such changes within the principles of this invention are intended to be included within the scope of the following claims.

I claim:

1. Apparatus for operating a plurality of different tools co-actively on a given workpiece which is being rotated by a lathe which apparatus comprises a support having a top surface and a side wall; means for mounting said support to said lathe; positioned in the top surface of the said support a plurality of threaded holes adapted to receive co-acting bolts, said holes and bolts affording means for holding a tool to said support in a fixed position and affording means for holding a housing for tools in a fixed position on said support; held by said support a plurality of tools; held by said support at least one housing for a tool; positioned within said housing a tool movable toward and away from the workpiece while the said support is stationary and a second reciprocating tool, the first said reciprocating tool being positioned and held in a housing on the top of the said support and the second reciprocating tool being positioned and held at the said side wall of the said support; means for effecting the said reciprocation of the said tools; connections between each of the said reciprocating tools effecting the forward and backward movement of the said tools in unison; and means for actuating the movement of the said reciprocating tools.

2. Apparatus in accordance with claim 1 which includes means for automatically effecting the backward movement of the said reciprocating tools upon the release of the means actuating the forward movement of the said tools.

3. Apparatus in accordance with claim 2 in which the said automatic means effecting the backward movement comprises spring means, there being one on each of said tools and each of the said spring means acting in unison with the other.

4. Apparatus in accordance with claim 3 in which one of the reciprocating tools is a facing tool and in which the other reciprocaitng tool is a part-off tool.

References Cited
UNITED STATES PATENTS

| | | | |
|---|---|---|---|
| 452,495 | 5/1891 | Lindner | 82—35 X |
| 459,867 | 9/1891 | Humans | 82—35 X |
| 2,369,014 | 2/1945 | Bruns | 82—36 X |
| 2,383,266 | 8/1945 | LeTourneau | 82—25 X |
| 2,832,248 | 4/1958 | Steele | 82—36 |

LEONIDAS VLACHOS, *Primary Examiner.*